Figures 1, 2, 3:
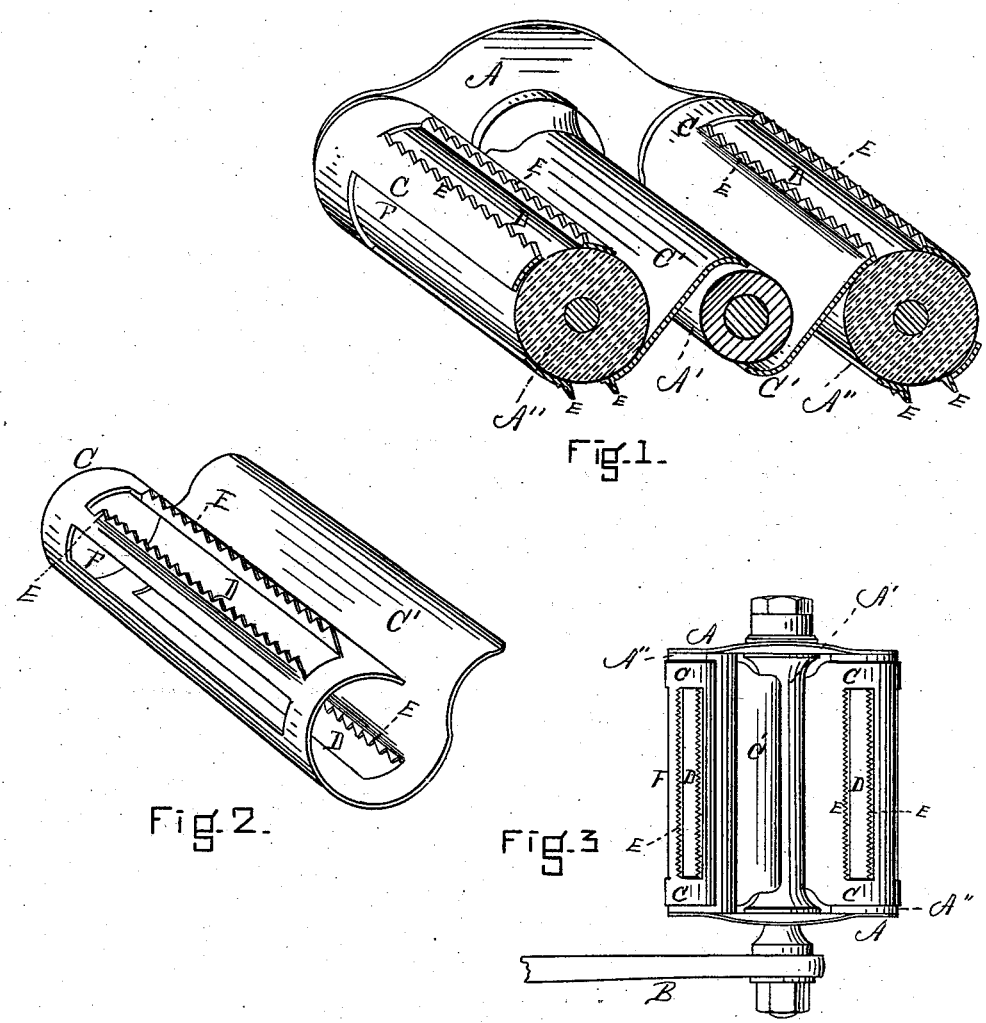

(No Model.)

J. S. MURRAY
PEDAL FOR VELOCIPEDES.

No. 260,114. Patented June 27, 1882.

WITNESSES
Joseph Ashbaugh.
D. W. Williams

INVENTOR
Joseph S. Murray
By his Atty.
Henry W. Williams

UNITED STATES PATENT OFFICE.

JOSEPH S. MURRAY, OF BOSTON, MASSACHUSETTS.

PEDAL FOR VELOCIPEDES.

SPECIFICATION forming part of Letters Patent No. 260,114, dated June 27, 1882.

Application filed December 24, 1881. (No model.)

*To all whom it may concern:*

Be it known that I, JOSEPH S. MURRAY, of Boston, in the county of Suffolk and State of Massachusetts, have invented a new and Improved Pedal-Slipper for Bicycles, Tricycles, and other Velocipedes, of which the following is a specification.

This improvement relates to that class of pedal-slippers termed "rat-trap" pedal-slippers. Those now in use are made of metal, and, being supplied with teeth or prongs, are, when applied to the pedals of a bicycle or tricycle, calculated to prevent the feet from slipping upon the pedals, especially in rapid riding, ascending hills, and riding over rough roads. There are, however, some objections to the pedal-slippers now in use, principal of which are that they are liable to be pushed off the pedals by the action of the feet at critical moments, thus endangering the safety of the rider, and that they apply to and cover but one side of the pedal at a time, thus forcing the rider, in case one of his feet jumps off the pedal, to turn it in order to find the side having the rat-trap slipper, as its weight carries that side of the pedal down.

In my improvement it is intended to produce a rat-trap pedal-slipper which cannot be pushed off the pedal by the foot, and which covers both sides of the pedal.

In the accompanying drawings, in which similar letters of reference indicate like parts, Figure 1 is a sectional view of a pedal with my slippers in position thereupon. Fig. 2 is a perspective view of a slipper removed. Fig. 3 is a plan of a pedal with my slippers attached.

A represents an ordinary pedal, in this instance the left pedal, of a bicycle, A' being the central bar, and A'' the rubber bars or cushions. B is the crank.

The rat-trap slippers consist of a pair of sheet-metal plates bent into the shape shown, the parts C of which are bent around and rest upon the rubber cushions A'', and the parts C' of which extend to and partially around and bear against the bar A'. Each slipper has two long openings, D, one above and one below the cushion upon which it is placed, which openings are flanked by teeth E, which are so inclined that when each set is uppermost it will point toward the rear of the bicycle, thus enabling the rider to press them well into the soles of his shoes and secure a firm grip.

It will be noticed that both sides of both cushions A'' are covered with the slippers, so that riders are not obliged to twirl the pedals with their feet in order to find the slipper. Also, it will be seen that the harder the rider presses with his feet—as in hill-climbing, for instance—the more he forces the slippers into their places, there being no tendency to throw or push them off, the tendency being just the reverse. In this invention the elasticity of the rubber cushions is utilized, as the slippers bear upon them, and not entirely on the bar A', as is the case with some now in use. From their shape they are easily "nested" in packing. A space or opening, F, is usually provided for the purpose of saving weight, &c.

As the teeth E should always point rearward, the pedal-slippers are made in "rights" and "lefts."

Having thus fully described my improvement, what I claim, and desire to secure by Letters Patent, is—

The herein-described improved rat-trap pedal-slipper for bicycles, tricycles, and other velocipedes, consisting of the part C, adapted to embrace one of the rubber cushions A'', and provided with one or more openings D and sets of teeth E, and the part C', adapted to bear against the central bar, A', constructed substantially as and for the purpose set forth.

JOSEPH S. MURRAY.

Witnesses:
HENRY W. WILLIAMS,
JOSEPH ISHBAUGH.